Feb. 24, 1959 P. J. SFERRAZZA 2,875,415
MICROWAVE POWER MULTIPLIER
Filed Jan. 17, 1955 2 Sheets-Sheet 1

INVENTOR
PETER SFERRAZZA
BY
ATTORNEY

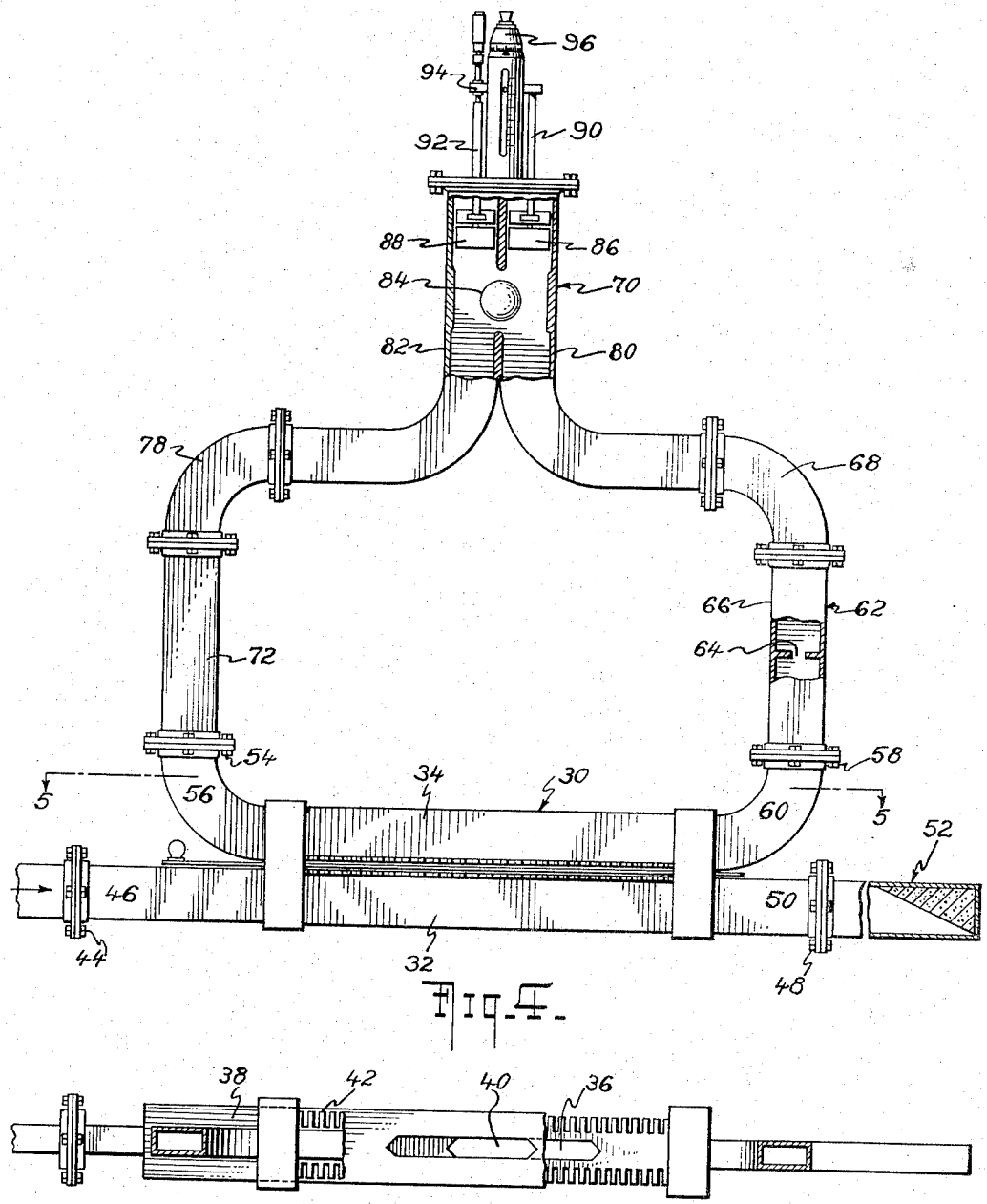

United States Patent Office

2,875,415
Patented Feb. 24, 1959

2,875,415

MICROWAVE POWER MULTIPLIER

Peter J. Sferrazza, Wantagh, N. Y., assignor to Sperry Rand Corporation, a corporation of Delaware Application January 17, 1955, Serial No. 482,076

6 Claims. (Cl. 333—10)

This invention relates to a microwave power multiplier, and more particularly, is concerned with apparatus for testing microwave components at high powers, using a low power microwave source.

It has been found desirable in the design of microwave components to be able to test these components to observe their performance at extremely high power levels. However, it is expensive and difficult to build microwave generators of sufficiently high power output to adequately test component designs. It is therefore desirable to devise test equipment in which the power level can be multiplied by a passive network driven from a relatively low power level microwave signal generator.

It is known that power multiplication can be achieved by utilizing the energy storage properties of resonant circuits. For example, it is known that the power level within a resonant cavity may greatly exceed the average power level of the exciting source. However, because of the nature of the resonant cavity and the fact that standing waves are generated within the cavity, it is virtually impossible to utilize the power build-up within the cavity to test microwave components. It is therefore desirable that a power multiplier for test purpose not store the power in standing waves.

It is the general object of this invention to provide a microwave power multiplier which can be used to test microwave components at sustained high power levels.

It is another object of this invention to provide high power microwave testing apparatus driven by a relatively low level microwave power source.

Another object of this invention is the provision of a microwave power multiplier utilizing passive network means.

Another object of this invention is to provide a microwave power multiplying network in which the energy in the high power region is in the form of a traveling wave, and not in the form of standing waves.

These and other objects of the invention which will become apparent as the description proceeds are achieved by apparatus comprising a four terminal wave guide directional coupler having a source of microwave energy coupled to one of the terminals. Two wave guide terminals of the directional coupler are externally coupled together by a section of wave guide, whereby a closed-loop energy path is provided by the coupler and the connected section of wave guide. Phase shifting means is connected in this section of wave guide to adjust the path length around the closed-loop energy path to an integral number of wavelengths at the frequency of the microwave energy source. The remaining terminal of the directional coupler is terminated in a non-reflecting load. There is energy build-up in the closed-loop energy path in the form of a recirculating wave which is utilized for test purposes by inserting the component to be tested in the section of wave guide forming the closed-loop energy path.

For a better understanding of the invention, reference should be had to the accompanying drawings wherein:

Fig. 4 is a plan view of one embodiment of the present invention;

Fig. 5 is a side elevational view, partly in section, of the embodiment of Fig. 4;

Figure 1:
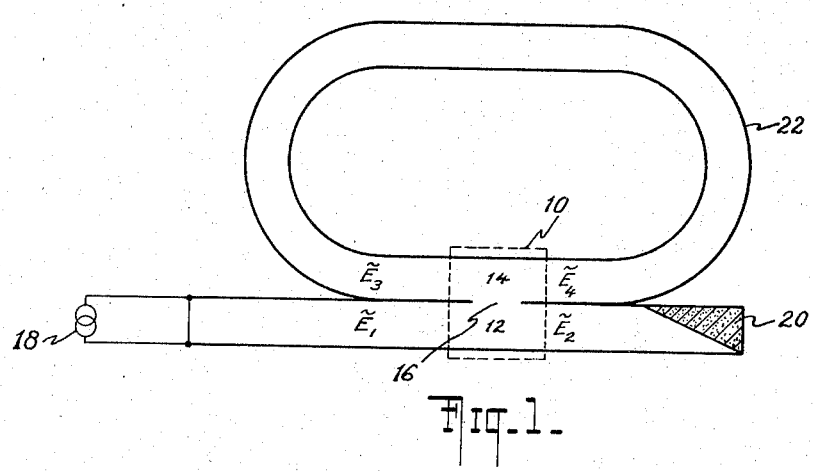
Fig. 1 is a diagrammatic showing of the basic power multiplying network contemplated by the present invention.

Referring to Fig. 1, the numeral 10 indicates generally a directional coupler having high directivity including two sections of hollow wave guide 12 and 14 having a directional coupling aperture 16 in the common wall between the sections of wave guide 12 and 14. The wave guide section 12 is connected at one end to a microwave source indicated schematically at 18 and is terminated at the opposite end by a non-reflective load 20. Opposite ends of the wave guide section 14 are connected by a closed wave guide loop 22.

The operation of the wave guide configuration of Fig. 1 can be appreciated from the following analysis. In any directional coupling device having high directivity, energy incident in one arm is divided between two of the other arms, but does not couple to the fourth arm (called the conjugate arm). Assuming the arms are all terminated in their characteristic impedance, so that power is proportional to the square of the voltages, it follows that $$e_i^2 = e_{o_1}^2 + e_{o_2}^2 \qquad (1)$$

where $e_i$ is the incident voltage in one arm and $e_{o_1}$ and $e_{o_2}$ are the respective output voltages from the two non-conjugate arms. For this to be true for any arm selected as the input arm, it can be shown that the voltages $e_{o_1}$ and $e_{o_2}$ must be in phase quadrature. Directional couplers of high directivity exhibit this phase quadrature relationship between the output signals.

If $e_{o_1}$ is the voltage coupled out of the primary wave guide of a directional coupler, it is generally designated as the direct wave; $e_{o_2}$ accordingly is coupled out of the secondary wave guide of the directional coupler and is designated the coupled wave. The amplitude relation between the direct wave $e_{o_1}$, coupled wave $e_{o_2}$, and incident wave $e_i$ can be expressed in terms of the coupling coefficient $C$ of the directional coupler as follows:

$$e_{o_2} = C e_i \qquad (2)$$
$$e_{o_1} = \sqrt{1-C^2} e_i \qquad (3)$$

where $C$ has a value between 0 and 1 depending on the amount of coupling provided by the aperture or apertures in the directional coupler.

Now consider the coupler arrangement of Fig. 1. The voltage $\tilde{E}_4$, which is a vector quantity including a magnitude $E_4$ and angle $\theta_4$, is coupled around the loop 22 to the conjugate arm of the coupler to provide an incident voltage $\tilde{E}_3$ at the coupler 10. The relationship between $\tilde{E}_3$ and $\tilde{E}_4$ can be expressed as $$\tilde{E}_3 = \alpha \tilde{E}_4 e^{-jBL} \qquad (4)$$

where $\alpha$ is the transmission coefficient of the wave guide loop and varies between 0 and 1 depending on the amount of attenuation. Normally $\alpha$ will have a value of substantially 1. The quantity $B$ is the phase constant of the wave guide loop expressed as phase shift per unit length and the quantity $L$ is the length of the loop. It will be evident that the voltage $\tilde{E}_4$ is made up of two voltage components, the coupled wave resulting from the input voltage $\tilde{E}_1$ and the direct wave resulting from the voltage $\tilde{E}_3$. This can be expressed mathematically by utilizing Equations 2 and 3 as $$\tilde{E}_4 = C\tilde{E}_1 \epsilon^{-i\left(\frac{\pi}{2}+\gamma\right)} + \sqrt{1-C^2}\tilde{E}_3 \epsilon^{-i\gamma} \quad (5)$$

where $$\frac{\pi}{2}$$

is the phase angle introduced by the coupler in the coupled wave relative to the incident wave and $\gamma$ is the phase angle introduced by the coupler in the direct and coupled waves relative to the incident wave.

The relationship between $\tilde{E}_4$ and $\tilde{E}_1$ can be determined by substituting the value of $\tilde{E}_3$ as expressed in Equation 4 into Equation 5, giving $$\tilde{E}_4 = C\tilde{E}_1 \epsilon^{\left(-j\frac{\pi}{2}+\gamma\right)} + \alpha\sqrt{1-C^2}\tilde{E}_4 \epsilon^{-i(BL+\gamma)} \quad (6)$$

from which the ratio of $\tilde{E}_4$ to $\tilde{E}_1$ can be derived as $$\frac{\tilde{E}_4}{\tilde{E}_1} = \frac{C}{1-\alpha\sqrt{1-C^2}\epsilon^{-i(BL+\gamma)}} \times \epsilon^{-j\left(\frac{\pi}{2}+\gamma\right)} \quad (7)$$

The absolute ratio of magnitudes of the resultant wave in the output of the wave guide section 14 to the incident wave from the source 18 in the wave guide 12 therefore is $$\left|\frac{E_4}{E_1}\right| = \frac{C}{1-\alpha\sqrt{1-C^2}\epsilon^{-i(BL+\gamma)}} \quad (8)$$

When the electrical length of the wave guide loop is an integral number of wave guide wavelengths, i. e., when $BL+\gamma$ is equal to $2\pi n$, the ratio of the magnitudes of $E_4$ and $E_1$ is a maximum, and may be expressed as $$\left|\frac{E_4}{E_1}\right| = \frac{C}{1-\alpha\sqrt{1-C^2}} \quad (9)$$

Figure 2:
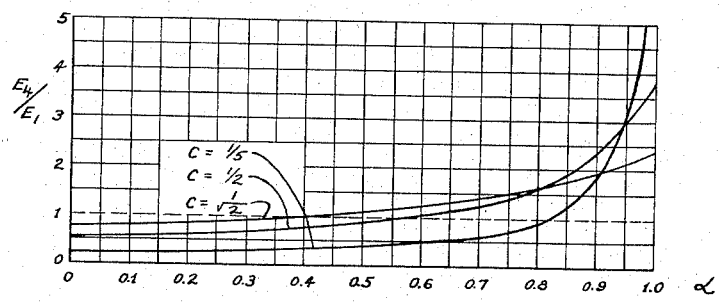
Figs. 2 and 3 are graphical curves used in explaining the theory of operation of the power multiplier.

In Fig. 2 is plotted a family of curves based on Equation 9 showing the ratio $E_4/E_1$ as a function of $\alpha$ with different values of coupling C. With $\alpha$ equal to 1 (zero attenuation around the closed loop) it will be seen that the smaller the coupling, the larger is the gain from $E_1$ to $E_4$. However, for a given attenuation around the loop there is a particular value of coupling that gives maximum voltage gain, not necessarily the minimum coupling. It will be seen that to achieve a gain greater than unity, the attenuation must be below a limiting value and as the attenuation is increased from zero ($\alpha=1$), the coupling must be increased to keep the gain above unity.

In other words, in the configuration of Fig. 1, power gain greater than unity can be achieved if the attenuation is below a critical value. As the attenuation is reduced, the lesser the coupling required to achieve a power gain in excess of unity and the greater the power gain that can be realized.

Another way of examining the power multiplication properties of the wave guide configuration of Fig. 1 is to consider its transient properties. Assume an incident wave from the source 18 traveling along the wave guide 12. A portion of this energy is coupled into the wave guide 14 as a coupled wave, and a portion continues down wave guide 12 as a direct wave to the load 20. The coupled wave travels around the loop formed by the wave guide section 22. At the coupling aperture 16 again this energy is divided, a portion being coupled to the load 20 and a portion recirculating around the closed loop 22.

If the phase of the portion recirculating around the loop 22 is such as to add to the coupled wave from the source 18, the energy in the wave guide 22 in the second cycle around the loop will be larger than during the first passage around the loop. This build-up of energy will continue with each cycle around the loop until the losses within the loop and absorption of energy by the load 20 exactly balance the output of the source 18. Assuming that the attenuation around the loop is zero, a steady state condition will be reached when the energy coupled to the load 20 is exactly equal to the energy output of the source 18. Since the coupled wave in the main guide resulting from the voltage $\tilde{E}_3$ is in phase opposition to the direct wave resulting from the voltage $\tilde{E}_1$, there is partial cancellation at the load 20. Hence the energy level in the loop during the steady state is at a higher level than the energy level at the load 20. Under such circumstances, the smaller the amount of coupling, the greater is the energy stored in the form of a traveling wave around the closed loop formed by the wave guide section 22, and the more cycles of the wave in the closed loop before the steady state condition is reached. This is so because of the relatively small increment of energy that is coupled out of the closed loop for each cycle.

Figure 3:
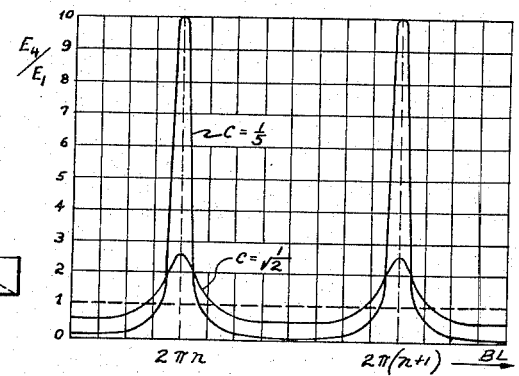

In Fig. 3 is shown a plot, based on Equation 8 of the gain as a function of the path length around the closed loop for two different values of coupling C. The resonance characteristic of the device is evident from these curves. It will be noted that the sharpness of the peaks, where the path length is an integral number of wavelengths long, is inversely related to the amount of coupling. Fig. 3 also represents the frequency sensitivity of the power multiplier, inasmuch as the wavelength varies substantially linearly with frequency and therefore the path length around the loop in terms of wavelengths varies substantially linearly with frequency.

Referring to Figs. 4 and 5, there is shown a preferred embodiment of the invention as above described. A directional coupler having variable coupling is provided, as indicated generally at 30. The coupler is of a type described in copending application Serial No. 213,276, filed February 28, 1951, in the name of Kiyo Tomiyasu, and includes a primary wave guide section 32 and secondary wave guide section 34 having their narrow walls in parallel relationship. Adjacent narrow walls of the wave guide sections 32 and 34 have opposing longitudinal coupling slots, as indicated at 36. Variable coupling is achieved by a longitudinally movable diaphragm member 38 having a registering aperture 40 positioned between the wave guide sections 32 and 34 for effectively varying the length of the coupling slots 36. Choke members in the form of tines 42 project outwardly on either side of the diaphragm member 38 to prevent energy leakage from between the wave guide sections 32 and 34.

A flange 44 is provided on the input end of the primary wave guide section 32 to form an input terminal 46 and a similar flange 48 is provided on the opposite end of the wave guide section 32 to form an output terminal 50. The input terminal 46 is connected to a source of microwave energy (not shown) while the output terminal 50 is connected to a matched load termination 52.

The secondary wave guide section 34 is provided at one end with a coupling flange 54 forming an input terminal 56, while the opposite end of the secondary wave guide section 34 is similarly provided with a flange 58 forming an output terminal 60. Energy coupled from the source to the input terminal 46 is divided at the coupling aperture between the primary and secondary wave guide sections, a portion of the energy continuing on to the output terminal 50 as a direct wave and the remaining portion of the energy being coupled to the output terminal 60 as a coupled wave. Due to the directive properties of the coupler, substantially no energy is coupled to the terminal 56 from the terminal 46.

The closed loop path between the secondary wave guide input terminal 56 and output terminal 60 includes a removable test piece, indicated generally at 62. The test piece of course will take a variety of forms but includes an input and output wave guide section by means of which it can be connected into the test apparatus. In the form shown, the test piece 62 is shown as a length of wave guide 66 having a window 64 therein. However, it is to be particularly understood that the test piece 66 is illustrated as a wave guide window by way of example only.

The test piece 62 is connected by a conventional flanged joint at one end to the output terminal 60 of the directional coupler 30 and at the other end is similarly connected by a flanged joint by a 90 degree elbow section 68 to a phase shifter, indicated generally at 70. The loop is completed by a shim section of wave guide 72 and an elbow section 78 which couple the phase shifter 70 to the input terminal 56 of the directional coupler 30.

The phase shifter 70 is illustrated as a type described in copending application Serial No. 360,327, filed June 8, 1953, in the name of Kiyo Tomiyasu, and includes two wave guide sections 80 and 82 having a common narrow wall in which is provided a coupling slot 84. The slot 84 is proportioned to couple fifty percent of the incident energy. Thus the wave guide sections 80 and 82 with the coupling slot 84 constitute a so-called hybrid coupler.

Adjustment of the effective length of the closed loop path by the phase shifter 70 is accomplished by a pair of short circuiting plungers 86 and 88 positioned respectively in the ends of the wave guide sections 80 and 82. The plungers 86 and 88 are supported by adjusting rods 90 and 92 connected at one end to a yoke 94. The yoke 94 is longitudinally positioned by a micrometer screw adjustment operated by a control knob 96 by means, whereby the plungers 86 and 88 are accurately positioned to adjust the amount of phase shift introduced by the shifter 70, in the manner taught in the above-mentioned copending application.

Figure 6:
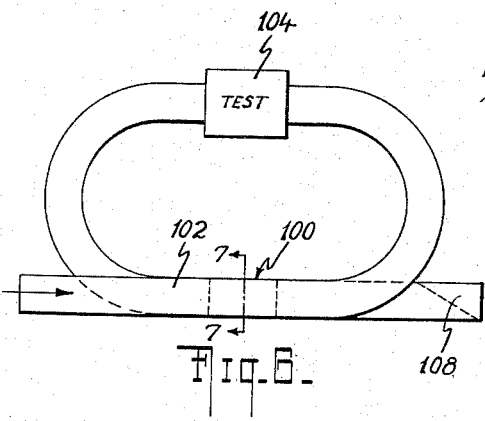
Fig. 6 is a pictorial representation of an alternative embodiment of the present invention.
Figure 7:
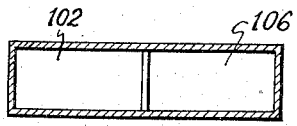
Fig. 7 is a sectional view taken on the line 7—7 of Fig. 6.

In Figs. 6 and 7 is shown an alternative arrangement of the power multiplier including a narrow wall type of directional coupler indicated at 100 with the primary wave guide section 102 connected at one end to a source (not shown) and connected at the other end to the test piece 104. The secondary wave guide section 106 in turn is connected at one end to the test piece 104 and terminates at the other end in a matched load indicated at 108. This configuration also can be shown to provide power multiplication in the region of the test piece 104. However, analysis of its operation is much more involved. The equation for the power gain of this configuration is given by the following equation:

$$\left|\frac{E_2}{E_1}\right| = \frac{\sqrt{1-C^2}}{\alpha(1-C)\epsilon^{-j\left(BL+\gamma+\frac{\pi}{2}\right)}} \quad (10)$$

From the above description it will be recognized that the various objects of the invention have been achieved by the provision of a power multiplication device which is particularly suited to testing microwave components at high power levels. While power multiplication is achieved by a resonance effect, with proper matching of all components there are no standing waves involved so that the power level at the test piece can be easily calculated by knowing the power output of the source. While the preferred embodiment has been illustrated and described as having a variable coupler and adjustable phase shifter of a particular type, it is to be understood that other means than those described may be incorporated to achieve the same function. Also, while a directional coupler of variable coupling is shown, the invention can of course be carried out with fixed coupling if so desired. It is to be understood that although a hollow rectangular type wave guide has been described and illustrated in the drawings, that other wave guides may be utilized, for example, coaxial lines, strip lines, or other equivalent types of wave guide structure. The word "wave guide" as used in the claims is to be considered a generic term applying to all types of transmission lines capable of guiding waves at microwave frequencies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Microwave high power testing apparatus comprising, a primary wave guide and a secondary wave guide electrically coupled by variable coupling directional coupling means, a source supplying electromagnetic waves coupled to one end of said primary wave guide, energy absorbing means coupled to the other end of said primary wave guide, a phase shifting means and means for mounting a microwave test component coupled with said secondary wave guide in a manner to produce a closed wave guide loop, a removable microwave test component electrically coupled with said mounting means, said phase shifting means being variable and adjusted so that the electrical length of the loop is substantially equal to an integral number of wave guide wavelengths at the frequency of said source, whereby waves coupled into the loop propagate around said loop as traveling waves, the transmission coefficient of the loop and the coupling coefficient of the directional coupling means being proportioned to produce a power level in the loop which is greater than the power level of said source.

2. Microwave high power testing apparatus comprising, a variable coupling wave guide directional coupler having four wave guide terminals, a source for supplying electromagnetic waves coupled to one of said wave guide terminals, wave guide means coupling two other of said terminals, said two other terminals also being electrically coupled to each other by said directional coupler, whereby a closed loop energy path is provided by said coupler and said wave guide means, said wave guide means including means for mounting a removable microwave component to be tested and for electrically coupling said component to said closed loop, said closed loop path being an integral number of wave guide wavelengths long at the frequency of said source, whereby waves coupled into the loop propagate around said loop as traveling waves, the transmission coefficient $\alpha$ of the loop and the coupling coefficient $C$ of the directional coupler being proportioned so that the power level of waves propagating in said loop is greater than the power level of said source, and energy absorbing means coupled to the remaining terminal of said directional coupler.

3. Microwave high power testing apparatus comprising, a wave guide directional coupler having a primary wave guide and a secondary wave guide, means for varying the coupling of said directional coupler to provide a continuous range of coupling values, a source for supplying electromagnetic waves coupled to one end of said primary wave guide, energy absorbing means coupled to the other end of said primary wave guide, a variable phase shifting means and means including a removable microwave test component coupled to said secondary wave guide so as to form a closed loop therewith, said phase shifting means being adjusted so that the electrical length of said loop is substantially equal to an integral number of wave guide wavelengths at the frequency of said source, whereby waves coupled into the loop propagate around the loop as traveling waves, the transmission coefficient $\alpha$ of the loop and the coupling coefficient $C$ of the directional coupler being proportioned so that the relationship $$\frac{C}{1-\alpha\sqrt{1-C^2}}$$

exceeds unity, whereby the power level of waves propagating in the loop may be made greater than the power level of the source.

4. Microwave high power testing apparatus comprising, a primary wave guide and a secondary wave guide electrically coupled by variable coupling directional coupling means, a source supplying electromagnetic waves coupled to one end of said primary wave guide, energy absorbing means coupled to the other end of said primary wave guide, wave guide means including means for mounting a removable microwave component to be tested and for electrically coupling said component with said secondary wave guide in a manner to produce a closed wave guide loop, the electrical length of said loop being substantially equal to an integral number of wave guide wavelengths at the frequency of said source, whereby waves coupled into the loop propagate around said loop as traveling waves, the transmission coefficient $\alpha$ of the loop and the coupling coefficient C of the directional coupling means being proportioned so that the relationship $$\frac{C}{1-\alpha\sqrt{1-C^2}}$$

exceeds unity, whereby the power level of waves propagating in the loop is greater than the power level of said source.

5. Microwave high power testing apparatus comprising, a wave guide directional coupler having four wave guide terminals, a source for supplying electromagnetic waves coupled to one of said wave guide terminals, wave guide means coupling two other of said terminals, said two other terminals also being electrically coupled to each other by said directional coupler, whereby a closed loop energy path is provided by said coupler and said wave guide means, said wave guide means including means for mounting a removable microwave component to be tested and for electrically coupling said component to said closed loop, said closed loop path being an integral number of wave guide wavelengths long at the frequency of said source, whereby waves coupled into the loop propagate around said loop as traveling waves, the transmission coefficient $\alpha$ of the loop and the coupling coefficient C of the directional coupler being proportioned so that the power level of waves propagating in said loop is greater than the power level of said source, and energy absorbing means coupled to the remaining terminal of said directional coupler.

6. The combination as claimed in claim 5 wherein a first terminal of said two other terminals is a terminal of a primary wave guide section and the second terminal of said two other terminals is a terminal of a secondary wave guide section.

References Cited in the file of this patent
UNITED STATES PATENTS

| | | |
|---|---|---|
| 2,200,009 | Nuttall | May 7, 1940 |
| 2,479,650 | Tiley | Aug. 23, 1949 |
| 2,605,323 | Samuel | July 29, 1952 |
| 2,633,492 | Ring | Mar. 31, 1953 |
| 2,739,288 | Riblet | Mar. 20, 1956 |
| 2,751,556 | Tomiyasu | June 19, 1956 |
| 2,757,366 | Zaleski | July 31, 1956 |
| 2,762,871 | Dicke | Sept. 11, 1956 |
| 2,768,356 | Van de Lindt | Oct. 23, 1956 |